Aug. 21, 1928.  
T. H. THOMAS ET AL  
1,681,561  
FLUID PRESSURE BRAKE  
Filed Oct. 8, 1927
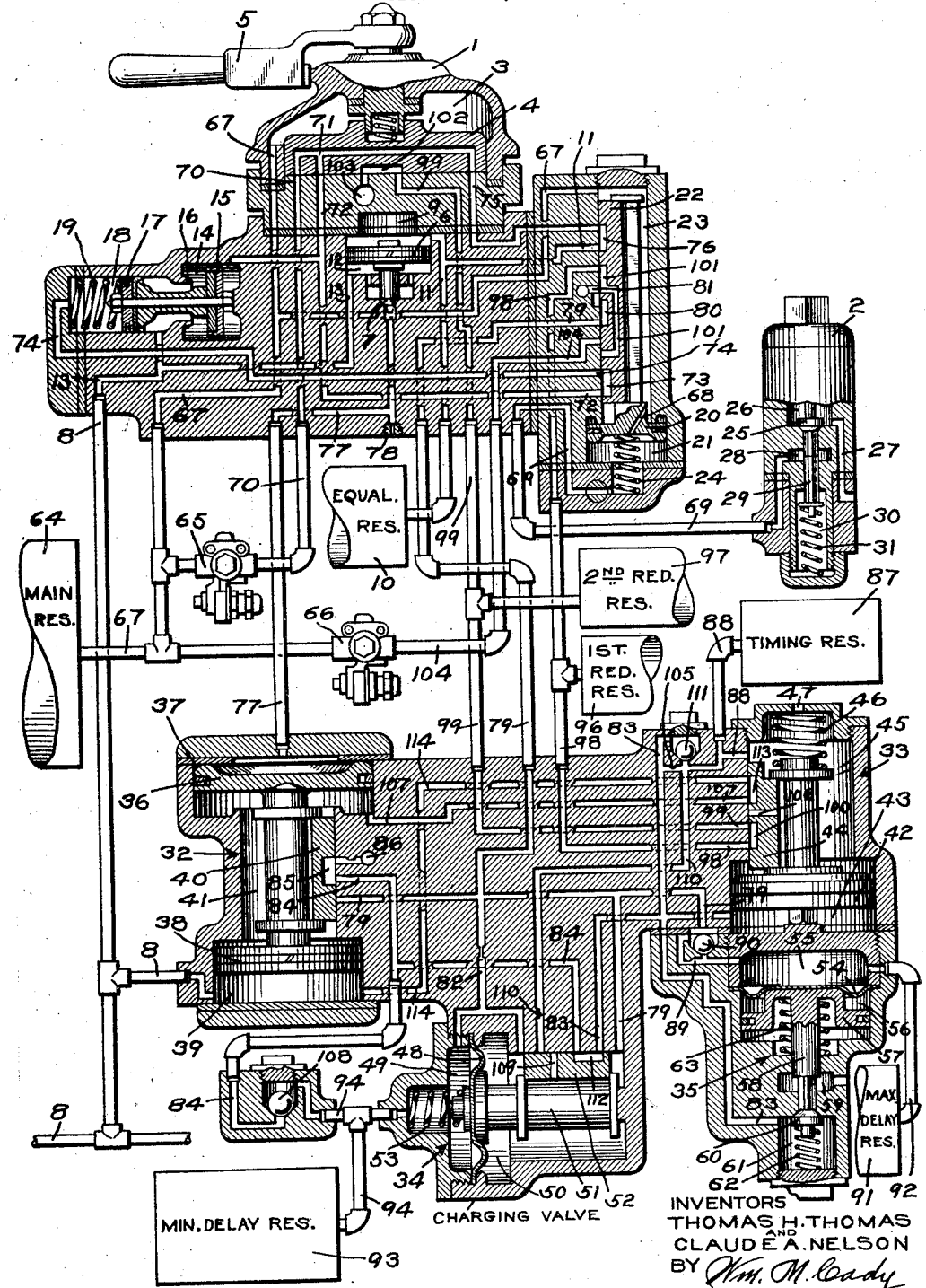
INVENTORS  
THOMAS H. THOMAS  
AND  
CLAUDE A. NELSON  
BY Wm. M. Cady  
ATTORNEY Patented Aug. 21, 1928.

1,681,561

UNITED STATES PATENT OFFICE.

THOMAS H. THOMAS, OF EDGEWOOD, AND CLAUDE A. NELSON, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed October 8, 1927. Serial No. 224,867.

This invention relates to fluid pressure brakes and in particular to the type of locomotive brake equipment having automatic means, including two reduction reservoirs, for effecting successive reductions in brake pipe pressure.

One object of our invention is to provide automatic means for separating the second reduction reservoir from the first reduction reservoir upon effecting the initial reduction in equalizing reservoir pressure.

Another object of our invention is to provide automatic means for maintaining the time elapsing between the start of the first reduction and the start of the second reduction within predetermined limits, which limits vary as the train length varies.

Another object of our invention is to provide automatic means for varying the degree of time elapsing between the start of the first reduction and the start of the second reduction substantially in proportion to the length of the train, and regardless of the degree of leakage of fluid under pressure from the brake pipe to the atmosphere.

Another object of our invention is to ensure a full and continuous service reduction in brake pipe pressure, in case of failure of the fluid pressure supply normally furnished to the split reduction device for controlling the operation of such device.

Other objects and advantages will appear in the following more detailed description of our invention.

In the accompanying drawing, the single figure is a diagrammatic view of an automatic train control apparatus embodying our invention.

As shown in the drawing, the automatic train control apparatus may comprise an automatic brake valve device 1, a magnet valve device 2 and a split reduction valve device.

The automatic brake valve device 1 is of the usual type employed with automatic train control apparatus and comprises a casing having a chamber 3, containing a rotary valve 4 adapted to be operated by a handle 5 and also comprises the usual equalizing piston mechanism, which includes an equalizing piston 6 and a brake pipe discharge valve 7 adapted to be operated by said piston for venting fluid under pressure from the brake pipe 8 to the atmosphere. The equalizing piston 6 forms a chamber 9 at one side, which chamber is connected to an equalizing reservoir 10 through passage 11 and at the opposite side said piston forms a chamber 12 which is connected to the brake pipe 8 through a passage 13.

The brake valve casing also has a chamber 14 containing a cut-off valve 15, which valve is adapted, in one position, to seal on a seat ring 16. The cut-off valve 15 is connected by means of a stem to a piston 17 contained in a chamber 18, which piston is adapted to operate the cut-off valve, said piston being opposed in outward movement by the pressure of a spring 19.

Preferably associated with the brake valve device is a brake application valve comprising a piston 20 contained in a chamber 21 and a slide valve 22 contained in a chamber 23 and adapted to be operated by said piston. The piston 20 is opposed in outward movement by the pressure of a spring 24.

The magnet valve device 2 comprises a casing, containing a magnet adapted to operate a valve 25 contained in a chamber 26, which chamber is connected to the atmosphere through a passage 27. The valve 25 has a fluted stem extending through an opening in the casing and into a chamber 28, in which chamber, said valve stem engages a stem 29, said latter stem extending through a wall of the casing and into a chamber 30, wherein a spring 31 acts on a thrust washer, engaging the lower end of said stem 29.

The split reduction valve device comprises a control portion 32, a hold back portion 33, a charging valve portion 34 and a delay valve portion 35.

The control portion 32 of the split reduction valve device comprises a piston 36 contained in a chamber 37 and a piston 38 contained in a chamber 39. Said pistons have different areas, are connected together by a stem, and are adapted to operate a slide valve 40 contained in a valve chamber 41. The hold-back portion 33 comprises a piston 42 contained in a chamber 43 and a slide valve 44 contained in a valve chamber 45, said slide valve being adapted to be operated by said piston. Inward movement of the hold-back piston 42 is opposed by the pressure of a spring 46 contained in the valve chamber 45, which valve chamber is connected to the atmosphere through a passage 47.

The charging valve portion 34 of the split reduction device comprises a diaphragm 48 forming at one side a chamber 49 and at the opposite side a chamber 50. A stem 51, contained in chamber 50, is carried by said diaphragm, and mounted between two shoulders on said stem is a slide valve 52, which slide valve is adapted to be operated by deflection of the diaphragm 48. Outward deflection of said diaphragm is opposed by the pressure of a coil spring 53 contained in the chamber 49.

The delay valve portion 35 of the split reduction device comprises a diaphragm 54 forming a chamber 55 at one side and a chamber 56 at the opposite side. Contained in the chamber 56 and engaged by the diaphragm 54 is a piston 57 having a centrally depending stem 58 extending through a wall in the casing and into an atmospheric cavity 59 formed in said casing. In the chamber 59 the piston stem 58 engages the fluted stem of a valve 60, such valve being contained in a chamber 61. The pressure of a coil spring 62, also contained in chamber 61, normally holds the valve 60 seated. A spring 63 is interposed between the under side of the piston 57 and a wall of the casing and is adapted to normally maintain said piston in the position shown in the drawing.

In operation, fluid under pressure from a main reservoir 64 is supplied to the rotary valve chamber 3 of the brake valve device, to the slide valve chamber 23 of the application valve device and to two feed valve devices 65 and 66, through the pipe and passage 67. Fluid from the application valve chamber 23 flows through a port 68 in the application piston 20 into the piston chamber 21 and from thence through passage and pipe 69 to the chamber 28 in the magnet valve device. With a train operating in territory in which the track conditions are favorable, the magnet of the magnet valve device 2 is energized, so that the valve 25 is seated. The fluid pressure thus is permitted to equalize on the opposite sides of the application piston 20, and the pressure of spring 24 then holds the application piston 20 and slide valve 22 in the inner or release position.

Fluid at the usual reduced pressure carried in the brake pipe is supplied by the feed valve device 65 to pipe and passage 70, which passage leads to the seat of the rotary valve 4. With the brake valve in release position, as shown in the drawing, fluid from passage 70 flows through port 71 in the rotary valve 4 and passage 72 to the cut-off valve chamber 14 and from passage 72 through cavity 73 in the application slide valve 22 and passage 74 to the cut-off valve piston chamber 18. The fluid pressure thus equalizes on the opposing sides of the cut-off valve 15 and cut-off valve piston 17, so that the pressure of spring 19 is permitted to shift the cut-off valve piston 17 inwardly and unseat the cut-off valve 15, thereby permitting feed valve fluid from the cut-off valve chamber 14 to flow past said valve and from thence to the brake pipe 8 and to the equalizing piston chamber 12, through passage 13. Fluid at feed valve pressure also flows from port 71 in the rotary valve 4 to the equalizing piston chamber 9 and to the equalizing reservoir 10 through passage 75, cavity 76 in the application slide valve 22 and passage 11. The fluid pressure thus becomes equal on the opposite sides of the equalizing piston 6, which piston then holds the brake pipe discharge valve 7 seated in the usual manner.

With the brake pipe discharge valve 7 seated, the control piston chamber 37 of the split reduction valve device is at atmospheric pressure on account of the connection through pipe and passage 77 and an atmospheric exhaust choke plug 78, so that the pressure of the brake pipe fluid acting on the control piston 38 in chamber 39 holds said piston, the control piston 36 and the slide valve 40 in the upward position, as shown in the drawing.

With the application slide valve 22 in the release position, the charging valve chamber 50 in the split reduction device is connected to the atmosphere through passage and pipe 79, cavity 80 in said slide valve and the atmospheric exhaust passage 81. Since the diaphragm chamber 49 of the charging valve portion is connected to the passage 79 through a choked passage 82, the fluid pressure in said diaphragm chamber is equal to that in the valve chamber 50, so that the pressure of spring 53 is permitted to hold the charging valve portion 34 in the position shown in the drawing, in which position, the hold-back piston chamber 43 and delay valve chamber 61 are connected to the atmosphere through passage 83, cavity 112 in the charging valve slide valve 52, passage 84, cavity 85 in the control slide valve 40 and through the choked atmospheric exhaust passage 86. The hold-back piston chamber being thus vented to the atmosphere, the pressure of spring 46 is permitted to hold the hold-back piston 42 and slide valve 44 in the downward position, in which position a timing reservoir 87 is connected to the atmosphere through pipe and passage 88, through the valve chamber 45 and through the atmospheric passage 47. The timing reservoir 87 is also connected to the atmosphere by way of the choked passage 105 and past the ball check valve 111 to the vented passage 83. Since the diaphragm chamber 55 of the maximum delay valve portion is connected through a choked passage 89 and past a ball check valve 90 to passage 79, which is connected to the atmosphere, and a maximum delay reservoir 91 is connected through pipe and passage 92 to the diaphragm chamber 55, both said chamber and reservoir are normally at atmospheric pressure. A minimum delay reservoir 93 is also normally at atmospheric pressure by reason of the connection through pipe and passage 94 to the vented charging valve diaphragm chamber 49.

With the diaphragm chamber 55 of the maximum delay valve portion 35 vented, the pressure of spring 63 holds the delay valve piston 57 in the position shown in the drawing, in which position, the pressure of spring 62 maintains the valve 60 seated.

A first reduction reservoir 96 and a second reduction reservoir 97 are normally connected together through pipes and passages 98 and 99 and cavity 100 in the hold-back slide valve 44. With the brakes released, the first reduction reservoir is connected to the atmosphere through pipe and passage 98, cavity 101 in the application slide valve 22 and the exhaust passage 81, while the second reduction reservoir is connected to the atmosphere through pipe and passage 99, cavity 102 in the rotary valve 4 of the brake valve device and the exhaust passage 103.

If a train enters territory in which the track conditions are unfavorable, the magnet in the magnet valve device 2 becomes de-energized and operates to permit the pressure of the coil spring 31 to unseat the valve 25 and thereby permit the fluid under pressure from the application piston chamber 21 to be vented to the atmosphere. The pressure of the fluid in the application valve chamber 23 then shifts the application piston 20 and slide valve 22 to the downward or application position, against the pressure of the coil spring 24.

With the application slide valve 22 in application position, the cut-off valve piston chamber 18 is vented to the atmosphere through passage 74, port 101 in the application slide valve 22 and the atmospheric exhaust passage 81, so that the opposing pressure of the brake pipe fluid on the cut-off valve piston 17 is permitted to shift said piston outwardly against the pressure of spring 19, such movement of said piston causing the cut-off valve 15 to be also shifted outwardly and seal on the seat ring 16 and thus prevent further flow of fluid under pressure to the brake pipe 8. The equalizing reservoir 10 and equalizing piston chamber 9 are connected to the first reduction reservoir 96 through passage 11, cavity 76 in the application slide valve 22 and passage and pipe 98, so that fluid under pressure from the equalizing reservoir is permitted to flow to the first reduction reservoir and thereby cause a decrease in the pressure in the equalizing piston chamber 9. The equalizing piston mechanism then operates in the well known manner to cause a corresponding decrease in the pressure of the brake pipe fluid.

Upon movement of the application slide valve 22 to application position, fluid at the pressure employed in the operation of the split reduction device, as supplied by the feed valve device 66 to pipe and passage 104, flows through cavity 80 in the application slide valve 22 and passage and pipe 79 to the charging valve chamber 50 of the split reduction device and also from passage 79 to the charging valve diaphragm chamber 49 and the minimum delay reservoir 93, through the choked passage 82. Since the rate of pressure build-up in the diaphragm chamber 49 is retarded by the choked portion of passage 82, the quicker build-up of pressure in the valve chamber 50 deflects the diaphragm 48 outwardly and thereby shifts the slide valve 52 to the left, in which position, passage 83 is connected to the valve chamber 50, and fluid from said valve chamber then flows through passage 83 to the hold-back piston chamber 43, to the maximum relay valve chamber 61 and through a choked passage 105 and passage 88 to a timing reservoir 87. Since the rate of supply to passage 83 exceeds the capacity of the choked passage 105, a pressure is immediately build up in the hold-back piston chamber 43 which acts to promptly shift the hold-back piston 42 and slide valve 44 upwardly to the first reduction position against the pressure of spring 46. In first reduction position of the hold-back slide valve 44, the passages 98 and 99 from the first and second reduction reservoirs 96 and 97, respectively, are disconnected from each other, so that the degree of the first reduction is thereby limited or fixed to the decrease in the pressure of the equalizing reservoir fluid permitted by the equalization into the first reduction reservoir 96.

In the first reduction position of the hold-back slide valve 44, the passage 88 from the timing reservoir 87 is lapped by said slide valve, thereby permitting a pressure to be built up in the timing reservoir 87 by flow through the choked passage 105. A port 109 through the charging valve slide valve 52 registers with a choked passage 110 and fluid from the valve chamber 50 flows through said choked passage also to the timing reservoir 87. The timing reservoir is thus charged through two choked passages, which permits a fast rate of build-up of pressure therein.

A port 106 through the hold-back slide valve 44 registers with a passage 107 leading to the control slide valve chamber 41, so that said chamber is thereby vented to the atmosphere by way of the hold-back slide valve chamber 45 and the atmospheric passage 47, for a purpose hereinafter explained.

Fluid supplied by the feed valve device 66 to passage 79, also flows to the maximum delay valve diaphragm chamber 55 through a choked passage 89 and from thence through pipe 92 to the maximum delay reservoir 91, wherein a pressure is built up at a predetermined restricted rate.

When the brake pipe discharge valve 7 is lifted, by operation of the equalizing piston 6, to effect a reduction in brake pipe pressure, a portion of the fluid discharged from the brake pipe 8 into the passage 77 is vented to the atmosphere through the choke plug 78. The capacity of said choke plug is less than the venting capacity of the discharge valve 7, so that a pressure is built up through passage and pipe 77 on the control piston 36 in chamber 37, which pressure acts to shift the control pistons 36 and 38 and slide valve 40 downwardly, after the control valve chamber 41 is vented to the atmosphere by the movement of the hold-back piston 42 and slide valve 44 to their upward position, in the manner hereinbefore explained.

In the downward position of the control slide valve 40, the cavity 85 in said slide valve connects passage 79, which is now connected to the feed valve device 66 through cavity 80 in the application slide valve 22, to passage 84 leading to the seat of the charging valve slide valve 52 and to a ball check valve 108, which check valve is lifted, thereby permitting fluid from passage 79 to flow through passage and pipe 94 to the diaphragm chamber 49 of the charging valve device and to the minimum delay reservoir 93, which quickly charges said chamber and reservoir to a pressure equal to the pressure of the fluid in the valve chamber 50. The pressure of the coil spring 53 then shifts the charging valve diaphragm 48 and slide valve 52 to the right, in which position, cavity 112 in said slide valve connects passages 83 and 84, and fluid under pressure from passage 84 then flows to the hold-back piston chamber 43, the maximum delay valve chamber 61 and to the timing reservoir 87. The charging valve slide valve 52 laps the choked passage 110, so that the rate of charging the timing reservoir is now reduced to the rate permitted only through the choked passage 105.

When the pressure of the brake pipe fluid is reduced a degree corresponding substantially to the degree of the first reduction in equalizing reservoir pressure, the equalizing piston 6 in the brake valve device operates in the usual manner to seat the discharge valve 7. When the pressure of the fluid discharged from the brake pipe to the control piston chamber 37 is then reduced to a predetermined degree by flow through the atmospheric exhaust choke plug 78 in the brake valve device, the pressure of the brake pipe fluid in the control piston chamber 39 shifts the control pistons 36 and 38 and the slide valve 40 to their upper position, in which position the timing reservoir 87, hold-back piston chamber 43, and maximum delay valve chamber 61, are vented to the atmosphere through passage 83, cavity 112 in the charging valve slide valve 52, passage 84, cavity 85 in the control slide valve 40 and the choked atmospheric exhaust passage 86, said timing reservoir being connected to the passage 83 by way of pipe and passage 88, past the ball check valve 11 and through the choked passage 105. The pressure of the fluid in the timing reservoir and hold-back piston chamber thus reduces at the same time, and when reduced to a predetermined degree, the opposing pressure of spring 46 shifts the hold-back piston 42 and slide valve 44 downwardly, until the cavity 100 in said slide valve connects the first and second reduction reservoirs 96 and 97 through the passages 98 and 99 respectively. The pressure of the fluid in the equalizing reservoir 10 and first reduction reservoir 96 then reduces a further degree by the flow of said fluid into the second reduction reservoir 97, which further reduction then causes the equalizing piston mechanism in the brake valve device to again operate and effect a corresponding second reduction in brake pipe pressure.

In order to prevent the control portion 32 of the split reduction device from being shifted to the first reduction position while effecting the second reduction, the control valve chamber 41 is charged with fluid at brake pipe pressure from the control piston chamber 39, by reason of the connection through passage 107, cavity 113 in the hold-back slide valve in second reduction position and passage 114. The fluid pressures then acting on the opposite sides of the control piston 38 and on the inner side of the control piston 36 are thus equal and since, when effecting a brake pipe reduction, the fluid pressure built up in the control piston chamber 37 is always slightly less than the pressure of the brake pipe fluid, the higher fluid pressure in valve chamber 41 in addition to the frictional resistance to movement of the control pistons and slide valve holds said pistons and slide valve in their normal position. This is desirable, since if the control pistons and slide valve were permitted to move to first reduction position while effecting the second reduction, the hold-back piston 42 and slide valve 44 would again be shifted to first reduction position and thereby prevent the second reduction from occuring.

In order to limit the degree of brake pipe reduction to that necessary for causing a full service application of the brakes, the brake valve device is turned to lap position, so as to close the connection from the second reduction reservoir 97 to the atmosphere through passage 99, cavity 102 in the brake valve rotary valve 4 and the atmospheric passage 103. The degree of reduction is then limited to the equalization of the fluid pressure in the equalizing reservoir 10, the first reduction reservoir 96 and the second reduction reservoir 97.

The period of time elapsing between the start of the first reduction and the start of the second reduction in brake pipe pressure should, for a train of a given length, be within certain predetermined limits under all conditions, in order to ensure the proper gathering of the slack between the cars in a train. Leakage of fluid under pressure from the brake pipe to the atmosphere hastens the rate at which a brake pipe reduction is made and delays the opening of the discharge valve 7 for a period of time proportional to the degree of said brake pipe leakage and under such conditions said discharge valve also remains open for a proportionally shorter period of time. As hereinbefore explained, the timing reservoir starts to charge at a fast rate through both the choked passages 105 and 110 substantially as soon as the brake application is initiated, and then when the control pistons and slide valves 40 are shifted to their downward position, said timing reservoir is charged at a slower rate through the choked passage 105 only. Since the time elapsing between the initiation of the brake application and the movement of the control portion 32 to first reduction position is proportional to the degree of brake pipe leakage, and since the discharge valve remains open for a period of time inversely proportional to the degree of brake pipe leakage, the degree of pressure obtained in the timing reservoir when charged, varies in proportion to the brake pipe leakage and the time during which the timing reservoir is being charged varies inversely to the degree of brake pipe leakage, so that in the case of brake pipe leakage, the timing reservoir becomes charged to a higher pressure in a shorter period of time than would be the case if the brake pipe were substantially air tight. Since, in the case of brake pipe leakage, the discharge valve remains open for a shorter period of time, the higher timing reservoir pressure starts to reduce sooner than would a lower timing reservoir pressure resulting from the effect of less brake pipe leakage. In a train of a given length, this results in the timing reservoir pressure always becoming reduced to the degree at which the second reduction is initiated in the same time, or within certain predetermined time limits, from the start of the first reduction.

In case the brake pipe leakage is so severe as to cause an initial reduction in brake pipe pressure as fast as the pressure in the equalizing reservoir 10 is reduced, the discharge valve 7 and the control portion 32 of the split reduction device will obviously not operate during the first reduction to time the movement of the hold-back portion 33 for initiating the second reduction, but under such a condition the second reduction in equalizing reservoir pressure is started within the proper time limit on account of the timed build-up of fluid pressure in the charging valve diaphragm chamber 49 and the delay reservoir 93, through the choked passage 82. When the fluid pressure in said chamber and reservoir becomes substantially equal to the fluid pressure in the charging valve chamber 50, the pressure of spring 53 deflects the diaphragm 48 and the slide valve 52 is then shifted by the diaphragm to its inner position, in which position the fluid under pressure in the hold-back piston chamber 43 and in the timing reservoir 87 is vented to the atmosphere through passage 83, cavity 112 in the charging valve slide valve 52, passage 84, cavity 85 in the control slide valve 40 and the choked exhaust passage 86. Thus, when the fluid pressure in the hold-back piston chamber 43 is reduced to a predetermined degree, the pressure of spring 46 shifts the hold-back piston 42 and slide valve 44 outwardly to the second reduction position, in which position the second reduction in equalizing reservoir pressure is effected.

If some of the triple valves on the cars in a long train fail to readily respond to a service reduction in brake pipe pressure, as might occur if the triple valve pistons become stuck in their cylinders, due to the accumulation of dirt or other foreign matter, a back flow of fluid under pressure from the auxiliary reservoir to the brake pipe occurs. Said back flow increases the quantity of fluid under pressure which has to be vented past the open discharge valve 7, and if the back flow is sufficient, the closing of the discharge valve may be so delayed as to prevent the second reduction from starting within the proper predetermined time limit. Under such a condition, if the second reduction is not started within a certain time, the fluid pressure in the delay valve diaphragm chamber 55 and the delay reservoir 91 becomes sufficient to deflect the diaphragm 54 and shift the piston 57 downwardly against the opposing pressure of spring 63. Such movement of piston 57 unseats the valve 60, which permits venting of the hold-back piston chamber 43 and timing reservoir 87 to the atmospheric exhaust chamber 59. The hold-back portion 33 then operates in the manner hereinbefore described to start the second reduction within the proper time limit.

The time required to gather the slack in a train varies as the train length varies, and since the second reduction of a two stage reduction can be started as soon as the slack is gathered, the time to the start of the second reduction can be obviously decreased as the train length decreases. According to our invention, the time between the start of the first and the start of the second reduction varies in proportion to the train length, since the timing reservoir 87 becomes charged to a proportionately lower degree of pressure when a train is short, because the discharge valve 7 is open for a shorter period of time to effect the first reduction in the brake pipe pressure of said shorter train. Since it requires a shorter period of time to reduce said lower timing reservoir pressure to the degree at which the second reduction is started, the total time from the start of the first to the start of the second reduction is thus less on a short train than it is on a long train.

If the fluid under pressure supplied to the split reduction device through pipe 79 should fail for any cause, such as the breaking of pipe 79, then if an automatic application of the brakes occurs, the hold-back portion 33 of the split reduction device will not be operated to separate passages 98 and 99 from the first and second reduction reservoirs 96 and 97 respectively. Consequently, when an automatic brake application is initiated, the fluid under pressure from the equalizing reservoir 10 will, at the same time, flow and equalize into both the first and second reduction reservoirs, thereby causing a full and continuous service brake application.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. Apparatus for effecting a reduction in brake pipe pressure in two stages including a first reduction reservoir, a second reduction reservoir, valve means normally connecting said reservoirs, an equalizing reservoir, an application valve device movable to application position to connect the first reduction reservoir with the equalizing reservoir, and means immediately responsive to the movement of said valve device to application position for operating said valve means to cut off communication between the first and the second reduction reservoirs.

2. Apparatus for effecting a reduction in brake pipe pressure in two stages including a first reduction reservoir, a second reduction reservoir, valve means normally connecting said reservoirs, an equalizing reservoir, an application valve device movable to application position to connect the first reduction reservoir with the equalizing reservoir, and means responsive to the movement of said valve device and independent of the initiation of the brake pipe reduction for effecting the movement of said valve means to cut off communication between the first and the second reduction reservoirs.

3. The combination with a brake pipe, of apparatus for effecting a reduction in brake pipe pressure in two stages including a first reduction reservoir, a second reduction reservoir, valve means normally connecting said reservoirs, an equalizing reservoir, an application valve device movable to application position in which the equalizing reservoir is connected to the first reduction reservoir, and a valve device responsive to an increase in fluid pressure and controlled by said application valve device for effecting the movement of said valve means so as to cut off communication between the first and the second reduction reservoirs.

4. The combination with a brake pipe, of apparatus for effecting a reduction in brake pipe pressure in two stages including a first reduction reservoir, a second reduction reservoir, valve means normally connecting said reservoirs and operated by an increase in fluid pressure for cutting off communication between said reservoirs, an equalizing reservoir, an application valve device movable to application position in which the equalizing reservoir is connected to the first reduction reservoir, and a valve device operated by an increase in fluid pressure and controlled by said application valve device for effecting an increase in pressure on said valve means.

5. The combination with a brake pipe, of apparatus for effecting a reduction in brake pipe pressure in two stages, including a first reduction reservoir, a second reduction reservoir, valve means normally connecting said reservoirs, a timing reservoir, a valve device, subject to the pressure in said timing reservoir and initially operative to effect the movement of said valve means to cut off communication between the first and the second reduction reservoirs, said valve device being operated upon a predetermined increase in pressure in the timing reservoir for effecting the movement of said valve means so as to connect the first and second reduction reservoirs.

6. The combination with a brake pipe, of apparatus for effecting a reduction in brake pipe pressure in two stages, including a first reduction reservoir, a second reduction reservoir, valve means normally connecting said reservoirs, an equalizing reservoir, a discharge valve mechanism, means for connecting said equalizing reservoir to the first reduction reservoir for operating said discharge valve mechanism to vent fluid from the brake pipe, and means for effecting the operation of said valve means to cut off communication between the first and second reduction reservoirs in advance of the operation of the discharge valve mechanism to vent fluid from the brake pipe.

7. The combination with a brake pipe, of apparatus for effecting a reduction in brake pipe pressure in two stages, including a first reduction reservoir, a second reduction reservoir, valve means normally connecting said reservoirs, an equalizing reservoir, a discharge valve mechanism, and means operative to connect the equalizing reservoir with the first reduction reservoir and to effect the operation of said valve means to cut off communication between the first and second reduction reservoirs.

8. The combination with a brake pipe, of apparatus for effecting a reduction in brake pipe pressure in two stages including a first reduction reservoir, a second reduction reservoir, a timing reservoir, and a valve device subject to the pressure in said timing reservoir and normally connecting the first and second reduction reservoirs, and operated upon a predetermined increase in pressure in said timing reservoir for cutting off communication between the first and second reduction reservoirs.

9. The combination with a brake pipe, of apparatus for effecting a reduction in brake pipe pressure in two stages including a first reduction reservoir, a second reduction reservoir, a timing reservoir, a valve device subject to the pressure in said timing reservoir and normally connecting the first and second reduction reservoirs and operated upon a predetermined increase in pressure in said timing reservoir for cutting off communication between the first and second reduction reservoirs, and means for first charging said timing reservoir at a rapid rate and then at a slower rate.

10. The combination with a brake pipe, of apparatus for effecting a reduction in brake pipe pressure in two stages including a first reduction reservoir, a second reduction reservoir, a timing reservoir, a valve device subject to the pressure in said timing reservoir and normally connecting the first and second reduction reservoirs and operated upon a predetermined increase in pressure in said timing reservoir for cutting off communication between the first and second reduction reservoirs, and a valve device first operated upon the charging of one side at a high rate and the other side at a lower rate for effecting the charging of said timing reservoir at a high rate, and then operated to effect the charging of said timing reservoir at a slower rate.

11. The combination with a brake pipe, of apparatus for effecting a reduction in brake pipe pressure in two stages including a first reduction reservoir, a second reduction reservoir, a timing reservoir, a valve device subject to the pressure in said timing reservoir and normally connecting the first and second reduction reservoirs and operated upon a predetermined increase in pressure in said timing reservoir for cutting off communication between the first and second reduction reservoirs, and a valve device for controlling the charging of said timing reservoir and also operative to effect the movement of said reduction reservoir controlling valve device to cut off communication between the first and second reduction reservoirs.

12. The combination with a brake pipe, of apparatus for effecting a reduction in brake pipe pressure in two stages including a valve device having a position for effecting a first reduction in brake pipe pressure and a position for effecting a second reduction in brake pipe pressure, a timing reservoir connected to one side of said valve device, and valve means having one position in which the opposite side of said valve device is supplied with fluid under pressure and in which said timing reservoir is charged at a high rate and another position in which said timing reservoir is charged at a slower rate.

13. The combination with a brake pipe, of apparatus for effecting a reduction in brake pipe pressure in two stages including a valve device having a first stage position and a second stage position, means tending to maintain said valve device in its first stage position while fluid is being vented from the brake pipe in making the first stage reduction in brake pipe pressure, a timing reservoir, and valve means operated upon a predetermined increase in pressure in said reservoir for effecting the movement of said valve device to its second stage position.

14. The combination with a brake pipe, of apparatus for effecting a reduction in brake pipe pressure in two stages including a valve device having a first stage position and a second stage position, means tending to maintain said valve device in its first stage position while fluid is being vented from the brake pipe in making the first stage reduction in brake pipe pressure, a timing reservoir, and valve means operated upon a predetermined increase in pressure in said reservoir for effecting the movement of said valve device to its second stage position regardless of whether fluid is being vented from the brake pipe.

15. The combination with a brake pipe, of apparatus for effecting a reduction in brake pipe pressure in two stages including a valve device having a position for effecting a first reduction in brake pipe pressure and a position for effecting a second reduction in brake pipe pressure, a valve mechanism for venting fluid from the brake pipe, and means operative in a predetermined time if said valve mechanism fails to open to vent fluid from the brake pipe after the brake application is initiated for effecting the movement of said valve device to its position for effecting an application of the brakes in two stages.

16. The combination with a brake pipe, of apparatus for effecting a reduction in brake pipe pressure in two stages including a valve device having a position for effecting a first reduction in brake pipe pressure and a position for effecting a second reduction in brake pipe pressure, a timing reservoir, valve means controlled by the pressure in said timing reservoir for controlling the operation of said valve device, a second timing reservoir, and valve means controlled by the pressure in said second timing reservoir for also controlling the operation of said valve device.

17. The combination with a brake pipe, of apparatus for effecting a reduction in brake pipe pressure in two stages including a timing reservoir, a valve device subject to the pressure of said timing reservoir for controlling the initiation of the second reduction in brake pipe pressure, a second timing reservoir, valve means subject to the pressure in said second timing reservoir for also controlling the operation of said valve device, a third timing reservoir, and valve means subject to the pressure in said third timing reservoir for also controlling the operation of said valve device.

18. The combination with a brake pipe, of apparatus for effecting a reduction in brake pipe pressure in two stages including a valve device for controlling the initiation of the second reduction in brake pipe pressure, a timing reservoir, valve means subject to the pressure in said reservoir for controlling the operation of said valve device, and means for charging said reservoir at one time at one rate and at another time at another rate.

19. The combination with a brake pipe, of apparatus for effecting a reduction in brake pipe pressure in two stages including a valve device for controlling the initiation of the second reduction in brake pipe pressure, a timing reservoir, valve means subject to the pressure in said reservoir for controlling the operation of said valve device, means for charging the reservoir at a predetermined rate, and means operated upon venting fluid from the brake pipe in effecting the first reduction in brake pipe pressure for charging said reservoir at a higher rate.

In testimony whereof we have hereunto set our hands this 6th day of October, 1927.

THOMAS H. THOMAS.
CLAUDE A. NELSON.